(12) United States Patent
Lokshin et al.

(10) Patent No.: US 7,026,987 B2
(45) Date of Patent: Apr. 11, 2006

(54) ASYNCHRONOUS ASSISTED GPS POSITION DETERMINATION

(75) Inventors: Anatole Lokshin, Claremont, CA (US); Jon Vavrus, Claremont, CA (US)

(73) Assignee: Thales Navigation, Inc., Santa Clara, CA (US)

(*) Notice: Subject to any disclaimer, the term of this patent is extended or adjusted under 35 U.S.C. 154(b) by 0 days.

(21) Appl. No.: 10/774,519

(22) Filed: Feb. 10, 2004

(65) Prior Publication Data

US 2005/0174286 A1    Aug. 11, 2005

(51) Int. Cl.
*H04B 7/185* (2006.01)
(52) U.S. Cl. .......................... 342/357.15; 342/357.09; 342/357.12; 342/357.13
(58) Field of Classification Search ........... 342/357.12, 342/357.09, 357.15, 357.13
See application file for complete search history.

(56) References Cited

U.S. PATENT DOCUMENTS

| | | | | |
|---|---|---|---|---|
| RE37,408 E | * | 10/2001 | Loomis et al. | 342/357.12 |
| 6,459,407 B1 | * | 10/2002 | Akopian et al. | 342/357.12 |
| 6,670,915 B1 | * | 12/2003 | McBurney et al. | 342/357.12 |
| 2003/0201935 A1 | * | 10/2003 | King et al. | 342/357.15 |

OTHER PUBLICATIONS

J.B.-Y. Tsui, Fundamentals of Global Positioning System Receivers, chapter 5, John Wiley & Sons, Inc., 2000.*

* cited by examiner

*Primary Examiner*—Thomas H. Tarcza
*Assistant Examiner*—Fred H Mull
(74) *Attorney, Agent, or Firm*—Lowe Hauptman & Berner, LLP

(57) ABSTRACT

A method of and computer system for assisting GPS position determination is described. Ephemeris and updated almanac information for a GPS satellite is received over a datalink. Based on the received updated almanac information and GPS parity algorithms, data bits of the GPS signal are reconstructed. Based on the current time, the reconstructed data bits are synchronized with the time of reception of a GPS signal from a satellite currently in view. The reconstructed data bits are subtracted from the received GPS signal at the synchronized time. A coherent integration of the received GPS signal over the time period corresponding to the reconstructed data bits is performed to obtain a GPS pseudo-range measurement. The GPS receiver position is determined using the generated, synchronized pseudo-range measurement and the ephemeris information received over the datalink.

33 Claims, 5 Drawing Sheets

ASYNCHRONOUS ASSISTED GPS POSITION DETERMINATION

FIELD OF THE INVENTION

The present invention relates to a method of and apparatus for assisting GPS-based system position determination; and in particular, to assisting GPS-based system position determination during periods of GPS signal unavailability.

BACKGROUND

It is known in the art to determine the position of a system using received signals, e.g. a global positioning system (GPS) satellite or pseudolite system transmits a signal to a GPS receiver to enable the receiver to determine its position. The GPS receiver, having an unobstructed view of the GPS satellite, receives the satellite-transmitted signal which includes data values indicating the transmitting satellite's location and the transmission time. The GPS satellites transmit the signal synchronously and because the GPS receiver distance from the GPS satellites varies, the transmitted signals are received at different times. The GPS receiver estimates the distance to each satellite by estimating the amount of time required for the signal to reach the receiver from the satellite.

Disadvantageously, in order to determine position, the GPS receiver must spend a significant amount of time to collect sufficient satellite data. At the same time, the GPS receiver decoding the satellite data requires a stronger GPS satellite signal than is required for position determination when satellite and time information are already known. Assisted-GPS (A-GPS) as a concept has gained significant popularity recently in light of stringent time to first fix (TTFF), i.e., first position determination, and sensitivity requirements of United States Federal Communications Commission (FCC) E-911 regulations. The E-911 regulations require wireless devices being used for emergency calls to report, among other things, the telephone number, location of the tower receiving the emergency call, and location information, e.g. latitude and longitude of the calling device to within 50 to 100 meters, of the wireless device. Problematically, wireless devices may be used in locations where there is no unobstructed satellite view, e.g. inside buildings or under tree cover, and consequently providing accurate location information responsive to the E-911 regulations is impossible.

A typical A-GPS service using a wireless link provides a GPS receiver with an information signal for determining the GPS receiver's approximate position, time synchronization mark, satellite ephemerides, and satellite Dopplers. Different A-GPS services may omit some of these parameters. The A-GPS service provided information allows a GPS receiver to perform a "hot" fix without requiring time to be spent on searching for the satellite Doppler and collecting ephemeris information.

Another important use of the assistance signal, i.e. the signal providing the above-described additional information, is to provide the GPS information bits in real-time to a GPS receiver. By receiving the information bits over a wireless link, a GPS receiver can perform longer than 20 millisecond (ms) coherent accumulation of the GPS signal and thereby increase the receiver sensitivity and allow performance of "in-door", i.e. obstructed, position determination satisfying the E-911 regulations.

Limitation of Current Techniques

Existing A-GPS approaches known to the inventor have the following major drawbacks:
  A. Requirement for point-to-point communication between a GPS receiver and a base station;
  B. Time delay between the moment when the GPS information bits are received by a GPS receiver via GPS satellite-transmitted signal and the moment when they become available via an A-GPS transmission;
  C. Point-to-point receiver-base communication is required every time a GPS receiver requires information bit values because only the base station is capable of removing the information bits from a low signal-to-noise ratio (SNR) signal; and
  D. Wireless communication between a GPS receiver and a base station is always required even if the GPS receiver had an unobstructed view of the sky for a short time prior to the moment when a high sensitivity fix is required, i.e., there is no A-GPS memory.

Each of the above-mentioned drawbacks is now described in detail.

A. Point-to-Point (P-P) Communication Constraints

The state of the art A-GPS message assumes a bi-directional, i.e. two way, point-to-point wireless communication link between a GPS receiver and a base station which collects and transmits the A-GPS information. In particular, a GPS receiver initiates the communication by requesting A-GPS information from the base station. Responsive to the GPS receiver request, the base station transmits the requested A-GPS message tailored for the particular receiver on a point-to-point communication link. The fact that the link is often realized via a wireless phone network or a packet switching service does not change the fact that the communication exchange is performed on a point-to-point basis.

A point-to-point communication protocol puts significant constraints on the overall system:
  1. A mobile GPS device or a GPS receiver must have transmit capability in addition to receive capability. This increases cost, complexity, and power use of the mobile GPS device, as well as, limiting the range of the A-GPS service because a stationary base station typically has a much more powerful transmitter than the mobile GPS device.
  2. As the number of mobile GPS devices served by a particular base station increases, the overall system communication bandwidth requirements increase.

B. Time Delay Constraints

The real-time requirements for transmission of the A-GPS information bits is even more restrictive than the above P-P communication constraint. Information bit sequence message needs to be individually constructed for each receiver.

There is a time delay between the information bits received by a GPS receiver and the time the same bits are received via an A-GPS message transmitted from a base station to the GPS receiver. Therefore, a receiver must use the information from the A-GPS message in post processing, thereby requiring more complicated algorithms and, most importantly, preventing use of the A-GPS message information bits for improving the sensitivity of the phase and frequency real-time tracking loops. Therefore, the current structure of the A-GPS message, i.e. the bits of information, is used only for enhancement of the GPS signal detection and is not suitable for improving tracking ability.

C. Tracking Constraints

Pseudo tracking can be achieved even without performing explicit GPS signal phase tracking inside a GPS receiver. A GPS receiver can record, approximately 500 ms of data, then use another 500 ms to request data bits for the sequence from the base station and use the received information to produce an individual high sensitivity fix. From a user perspective, such a GPS receiver produces a fix every second giving the appearance of tracking; however, the algorithm is less accurate than using real-time GPS signals, satellite signal-based tracking and requires constant point-to-point communication between the GPS receiver and base station.

D. "No A-GPS Memory" Constraint

Current A-GPS systems require a bi-directional, i.e. two way, point-to-point wireless communication every time a new high sensitivity fix is required. Assuming a GPS receiver is required to wake up every 30 minutes, determine its position, and if the position has changed from the last fix by more than a predetermined distance, then an alarm must be transmitted to the base station. Current A-GPS systems require a new point-to-point communication every time an assisted fix is desired. The fact that the assistance (A-GPS signal) was transmitted some time ago for the previous fix is not used.

SUMMARY

It is therefore an object of the present invention to provide a system for assisting GPS position determination.

Another object of the present invention is to provide a system for assisting GPS position determination in a covered environment.

Another object of the present invention is to provide assistance information via broadcast instead of point-to-point communication with a GPS receiver restoring missing information from a previously broadcast assistance message.

The present invention provides a method and computer system for assisting GPS position determination.

A method aspect of assisting GPS position determination includes receiving ephemeris and almanac information for a GPS satellite over a datalink. Based on the received almanac information and GPS parity algorithms, the data bits of the GPS signal are reconstructed. Based on the current time, the reconstructed data bits are synchronized with the time of reception of a GPS signal from a satellite currently in view and the reconstructed data bits are subtracted from the received GPS signal at the synchronized time. The received GPS signal is coherently integrated over the time period corresponding to the reconstructed data bits in order to obtain a GPS pseudo-range measurement. GPS receiver position is determined using the generated, synchronized pseudo-range measurement and the ephemeris information received over the datalink.

A computer system aspect includes one or more processors for receiving and transmitting data and a memory coupled to the processors having stored received ephemeris information, almanac information, GPS parity algorithms, and instructions for execution by a processor. Execution of the instructions by the processor cause the processor to reconstruct data bits of the GPS signal based on the stored ephemeris and/or almanac information and GPS parity algorithms. The reconstructed data bits are synchronized with the time of reception of a GPS signal from a satellite currently in view based on the current time and approximate position and the reconstructed data bits are subtracted from the received GPS signal at the synchronized time. The received GPS signal is coherently integrated over the time period corresponding to the reconstructed data bits to obtain a GPS pseudo-range measurement and a position is determined using the generated, synchronized pseudo-range measurement and the stored ephemeris information.

A further computer system aspect includes a processor for receiving and transmitting data and a memory coupled to said processor having stored received ephemeris information and updated almanac information for a GPS satellite from a GPS signal transmitted by the GPS satellite and sequences of instructions for execution by a processor. Execution of the instructions by the processor cause the processor to determine if a strong GPS signal is received or if a weak or no GPS signal is received. If a strong GPS signal is received, the processor generates a fix and updates time, position, ephemeris, and almanac information. If a weak or no GPS signal is received, the processor reads the stored received ephemeris information, updated almanac information, and stored received time and position information to generate a fix.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

An embodiment of the present invention overcomes all of the above limitations. The present invention makes use of the fact that the coding algorithm of the GPS information message is known and different parts of the message remain constant for significant periods of time. In particular, ephemeris values are constant for one hour and almanac values change only once a week.

Therefore, by knowing the information content of the GPS message, a GPS receiver can restore the presentation of the message, i.e. the information bit values, for most of the GPS message, as described in detail below. This allows a GPS receiver to perform high sensitivity acquisition and real-time tracking without requiring immediate point-to-point wireless communication.

GPS Data Format

Figure 1:
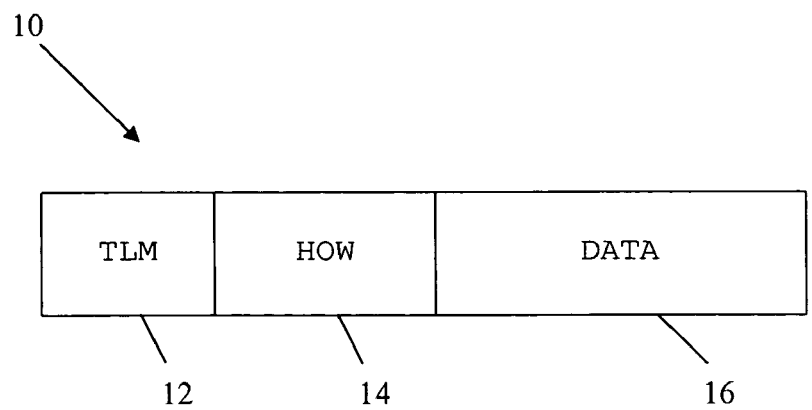
FIG. 1 is a data format specification of a sub-frame of a GPS signal.
Figure 2:
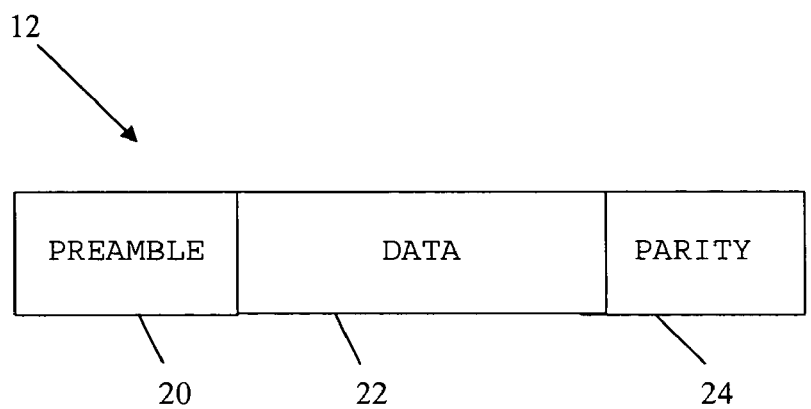
FIG. 2 is a data format specification of a telemetry word of the sub-frame of FIG. 1.
Figure 3:
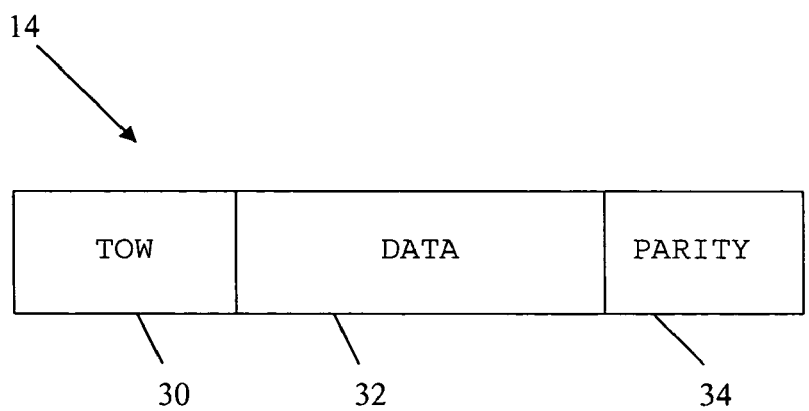
FIG. 3 is a data format specification of a hand-over word of the sub-frame of FIG. 1.

The data bits transmitted by the GPS satellites are arranged as a data frame having five (5) sub-frames each six seconds in length (300 bits each) and repeating with a specific pattern every 30 seconds. Most of the sub-frame data changes infrequently or in a predictable way. With reference to FIG. 1, a sub-frame 10 includes a telemetry word (TLM) 12, a hand-over word (HOW) 14, and a data field 16. With reference to FIG. 2, each TLM word 12 includes an eight (8) bit preamble field 20, a twenty-four (24) data field 22, and a six (6) bit parity field 24. With reference to FIG. 3, each HOW word 14 includes a seventeen (17) bit time of week field 30, a seven (7) bit data field 32, and a six (6) bit parity field 34.

Figure 4:
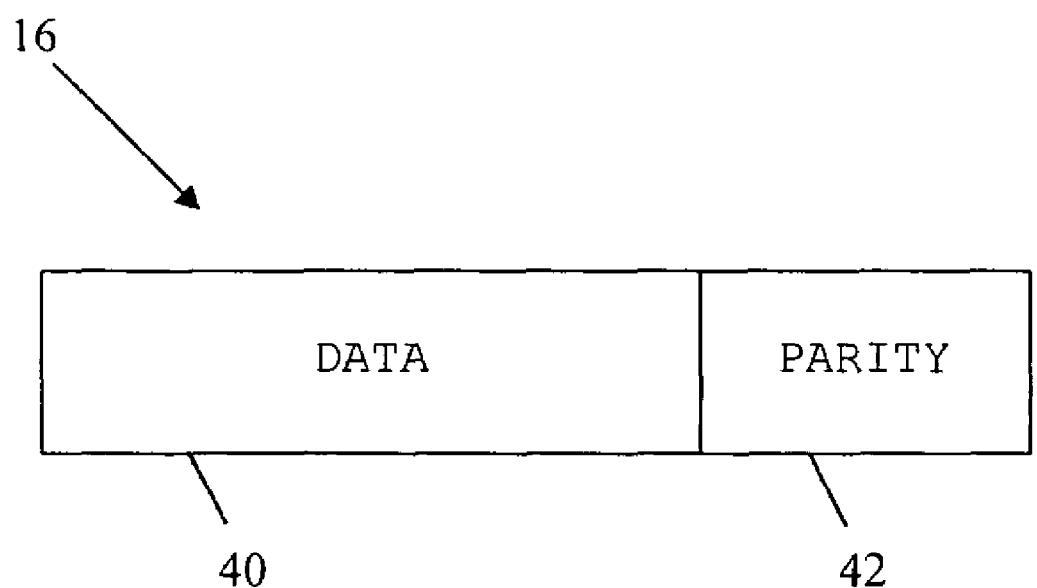
FIG. 4 is a data format specification of a data field of the sub-frame of FIG. 1.

With reference to FIG. 4, each data field 16 includes ten words each thirty (30) bits in length including a twenty-four (24) bit data field 40 and a six (6) bit parity field 42. Parity field 42 value is computable based on the data field 40 value and the previously received parity field value. The parity and data field values 40, 42 are constructed such that the first and third words are "unlocked" from the previous words allowing for a restart of the parity stream at first and third word locations.

Each frame starts with two words of TLM and HOW data each thirty (30) bits in length as described in conjunction with FIGS. 2 and 3. The data in these words remains constant except for:

Bits 9–22 of the TLM word 12—Contains information for the classified user, this is not correction information and will probably change infrequently. It can be assumed to be constant for each satellite;

Bits 1 to 17 of the HOW word 14—This is the Z-count and can be computed based on the current second; and Bits 18 and 19 of the HOW word 14—These are flags that rarely change and so can be assumed to be constant for each satellite The other words of the various sub-frames contain data as follows:

Sub-frame 1: Contains 4 words of SA/AS (Selective Availability/Anti-Spoofing) correction information. Plus 4 words of ephemeris/time information. Since this SA/AS information can change with every repeat of this frame and is, essentially, unpredictable, this frame cannot be reliably reconstructed.

Sub-frame 2: Contains ephemeris information that can be recreated from information stored for positioning.

Sub-frame 3: Contains ephemeris information that can be recreated from information stored for positioning.

Sub-frame 4: Cycles through 25 different sets of data. Eight of the sets contain almanac data and one set contains ionospheric and UTC data; the 9 sets can be recreated. The order of the transmission of the pages is also fixed, so that the period when the recreatable pages are transmitted can be predicted.

Sub-frame 5: Cycles through 25 different sets of data. All 25 pages contain almanac related data and can be recreated.

Thus, for 9 out of 25 thirty second transmission cycles, 24 seconds of data can be constructed. The remaining 16 of 25 thirty second transmission cycles will have a 12 second and 6 second period of constructable data. During these periods, the reconstructed data can be used to strip the data bits from the received GPS signal allowing for coherent integration.

Additionally, because all satellites transmit the same frame and page sequence at the same time, these coherent integration periods coincide for all satellites being used for positioning. Monitoring of signal strength (I/Q power level) can also be used to help determine when data has changed (signal strength will drop when the data changes).

Two approaches to assisting GPS-based system position determination are now described: using a datalink to broadcast updated information to a GPS receiver and using recently received information by the GPS receiver.

Using a Datalink

Figure 5:
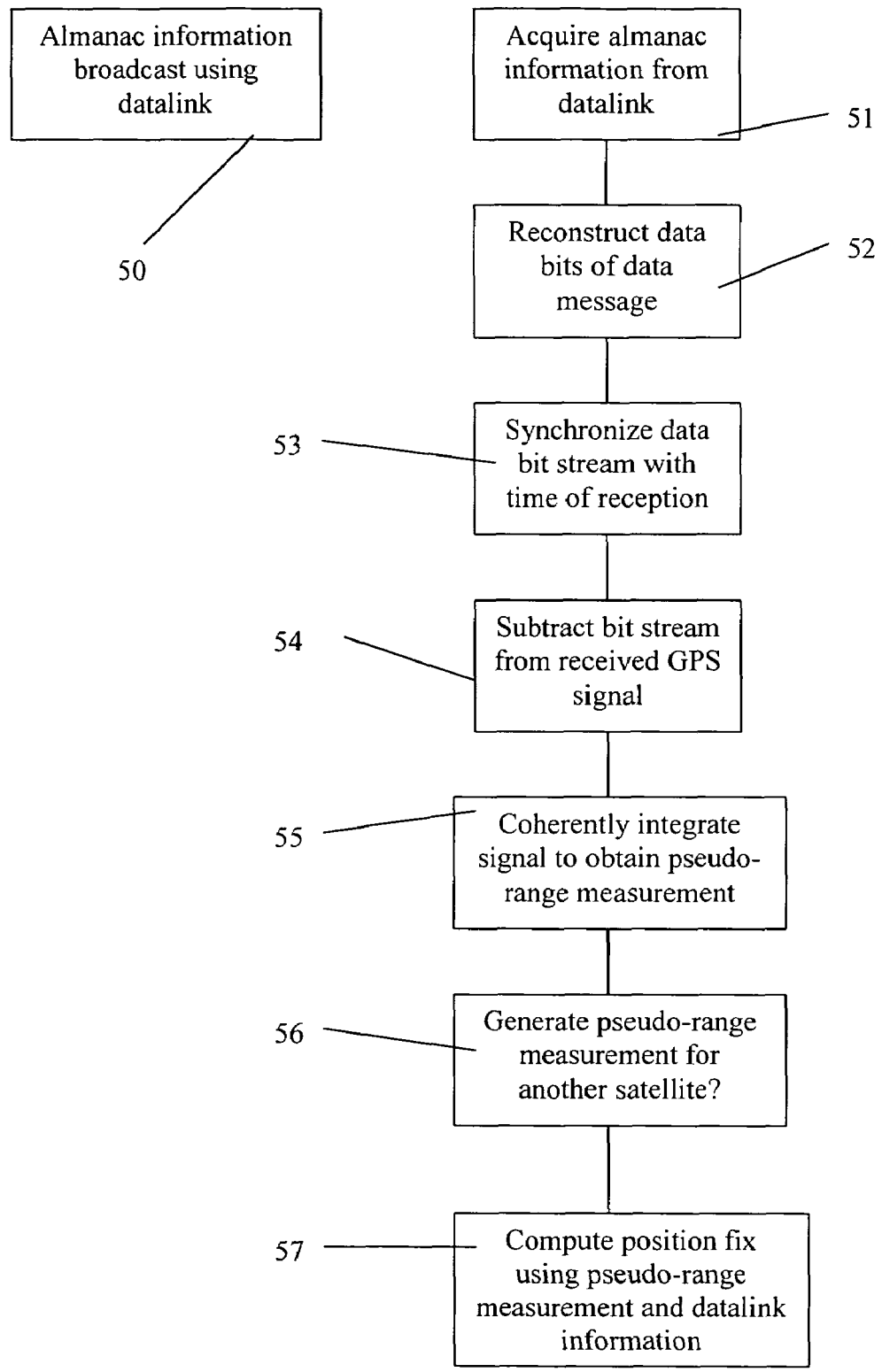
FIG. 5 is a process flow diagram of an embodiment according to the present invention.
Figure 6:
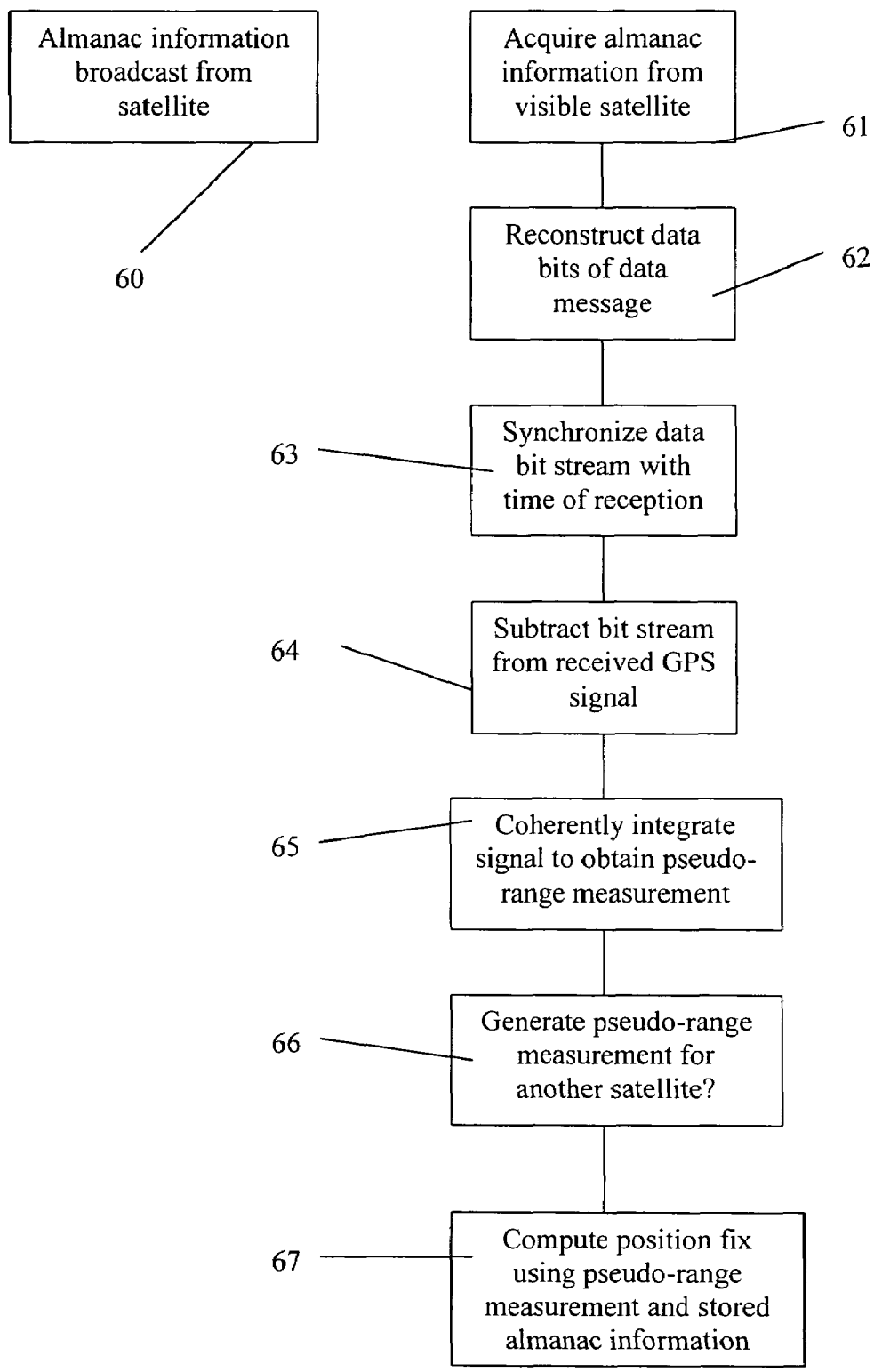
FIG. 6 is a process flow diagram of another embodiment according to the present invention.

A GPS receiver can use minimal datalink bandwidth to obtain higher sensitivity through coherent integration of GPS signals through data bit stripping. The bandwidth limitation is on the side of the base station transmitter required to transmit ephemerides and data bits individually to thousands of GPS receivers. The process flow according to an embodiment of the present invention is now described with reference to FIG. 5.

Initially, a GPS satellite broadcasts almanac and ephemeris information. At step 50, a GPS base station receives the broadcast almanac and ephemeris information, and transmits the formatted almanac and ephemeris information to a GPS receiver over a datalink. The GPS receiver acquires almanac and ephemeris information for all satellites from the datalink in step 51. The almanac and ephemeris information is acquired in either a point-to-point method or through one-to-many broadcasting between the GPS base station and the GPS receiver.

In an alternate embodiment, the GPS base station broadcasts the almanac information over the datalink upon a change of almanac information, commonly only once a week, or when requested by the remote GPS receiver.

The broadcast almanac and ephemeris information need not be in the format received from the GPS satellite, but rather can be formatted to make it convenient for datalink broadcast. The total amount of bits transmitted over a very slow 50 Hz data link is attempted to be minimized in a satellite data broadcast. As a result, all the data broadcast are bit packed and encoded using a particular coding method. A terrestrial broadcast datalink does not have the 50 Hz communication bandwidth limitation; therefore, the same information can be sent much faster and in a format, e.g., explicit data values, not bit compacted data values, which is easier to include in the A-GPS message and easier to decode by the receiver.

At step 52, the GPS receiver uses the received almanac information along with the known GPS parity algorithms to reconstruct 240 contiguous data bits of words 3 through 10 of page 5 of the GPS satellite data message, as well as, 240 contiguous data bits of words 3 through 10 of page 4 of the GPS satellite data message used to transmit almanac information. If the content of the message is known, then the receiver can encode the data the same way as performed by the GPS satellite; therefore, a remote GPS receiver knows the exact bit sequence transmitted by each satellite.

At step 53, the GPS receiver uses its knowledge of time to synchronize the reconstructed data bit stream with the actual time of reception occurring from satellites currently above the horizon. The GPS receiver is not required to have exact time knowledge. The receiver can use several shifted sequences in attempting to synchronize the satellite message and the received signal. For example, if time uncertainty is expected to be +/−1 ms, the receiver checks 3 possible synchronizations: (1) nominal time, (2) one ms forward, and (3) one ms backward. This procedure is described in detail below.

At step 54, the GPS receiver subtracts the reconstructed data bit stream from the received GPS signal to remove the data bit modulation from the corresponding received GPS signal.

At step 55, the GPS receiver coherently integrates the signal for up to 4.8 seconds of the processed GPS signal to obtain a pseudo-range measurement.

At step 56, the GPS receiver uses the property that all GPS satellites transmit the almanac information at the same time in the same sequence to perform the simultaneous creation of pseudo-range measurements from multiple GPS satellites. That is, the receiver performs steps 54 and 55 on all received signals from the same time. Because the data bit pattern is the same on all satellites during the almanac transmission time, all the almanac data bits can be removed and the signal integrated such that the results are applied directly to the position determination algorithm.

At step 57, the GPS receiver computes a position fix using the synchronized, generated pseudo-range measurements and ephemeris (or satellite position) information obtained from the datalink.

Without a Datalink

In accordance with another embodiment of the present invention, a GPS receiver uses previously received data to obtain higher sensitivity through coherent integration of GPS signals through data bit stripping.

Initially at step 60, a GPS satellite broadcasts almanac and ephemeris information to a GPS receiver. At step 61, the GPS receiver receives almanac information for all satellites and ephemeris information for visible satellites.

When the GPS receiver is in a covered, i.e. non-clear, environment, e.g. inside a building, the GPS receiver uses the previously received almanac and ephemeris information to compute position fixes.

At step 62, the GPS receiver uses the obtained almanac and ephemeris information along with the known GPS parity algorithms to reconstruct 240 contiguous data bits of words 3 through 10 of page 5 of the satellite data message, as well as, 240 contiguous data bits of words 3 through 10 of page 4 of the satellite data message used to transmit almanac information.

At step 63, the GPS receiver uses an accurate knowledge of time to synchronize the data bit stream with the actual time of reception occurring from satellites currently above the horizon.

At step 64, the GPS receiver subtracts the reconstructed bit stream from the received GPS signal to remove the 50 bits per second data from up to 4.8 seconds of the received GPS signal.

At step 65, the GPS receiver coherently integrates the signal for up to 4.8 seconds to obtain a GPS pseudo-range measurement.

At step 66, the GPS receiver uses the property that all GPS satellites transmit the almanac pages at the same time in the same sequence to perform the simultaneous creation of pseudo-range measurements from multiple GPS satellites.

At step 67, the GPS receiver computes a position fix using the synchronized pseudo-range measurements and stored ephemeris information.

EXAMPLE

An example application of an embodiment according to the present invention is helpful to an understanding of the present invention.

An independent GPS signal is received once every millisecond. However, by integrating the received signal for a time period longer than one millisecond, a higher SNR is achieved.

The GPS signal is modulated by 20 millisecond (ms) of data which are +1 or −1 in value.

To obtain a GPS fix in a condition when satellite-based signals are obstructed or attenuated, i.e., heavy foliage, inside a building, inside a package in a container/trailer, stolen car in a garage, it is necessary to coherently integrate the GPS signal for a period longer than 20 ms.

In order to be able to integrate for longer than 20 ms, it is necessary to know some of the signal-contained data bits because the data can change sign and then longer integration leads to a smaller SNR, e.g., 20 ms of +1 plus 20 ms of −1 results in a zero (0) value. If, however, it is known that a data bit was changed in the middle, then the integration results in the following: 20*1+(−20)*(−1)=40. To detect weak signals, integration is performed for as long as possible. If a signal changes sign in the middle of integration without "integrator" knowledge about the sign change, instead of improving the signal, the result of the integration becomes close to zero.

The traditional A-GPS method is to broadcast the data bit sequence for each GPS satellite together with the time stamp when the data bits were broadcast. The A-GPS also synchronizes the internal GPS receiver clock using an external signal, then the GPS receiver can "strip" the data bits and integrate longer than 20 ms. Because this service was developed to support an E-911 federal mandate, a fix must be obtained as quickly as possible, thereby requiring transmission of all the bits that were broadcast "right now", i.e., at the present time, when a request for a fix is received from the GPS receiver at the base unit.

Assuming an immediate fix is not required, i.e., on the order of several seconds in the worst case, then transmission of all the bits is not required; therefore, only the ones which are known how to decode are used. Depending on the longest acceptable wait time, ephemeride or almanac information is used to determine a position fix.

Because almanac or ephemeris data does not change frequently, instead of restoring bits every time a fix is needed, the bit pattern may be stored for the entire 30 second period (recoverable part of it) once and use the bit pattern until the data itself has change, i.e., every hour for ephemeris and once a week for almanac information.

If, after computing a self-assisted high sensitivity fix, a receiver is positioned with a clear view of the sky—moved out of a building, etc., the receiver collects new ephemeris data and almanac data in order to be ready for the next period when the GPS signal is obstructed Knowledge of the bit values is not enough, as described above, the bit stream must be synchronized with the internal GPS receiver clock. However, this must be performed to within approximately 2–3 ms only, because even assuming a 2 ms synchronization error, after 30 ms integration time the worst result is equivalent to 26 ms integration time which is better than effective 16 ms if the bits are not known and the clock error is the same. That is, the longer a (coherent) synchronized integration, the better.

Without an external time synchronization mechanism, an internal GPS receiver clock is accurate to within a couple of milliseconds given knowledge of an approximate position.

Each additional millisecond error incurs about 100–200 mile position error, therefore, if a position is known approximately, then the exact time synchronization is not critical.

Assuming a range of a possible time synchronization error is known, the error may be eliminated or reduced by making several integration passes over the same data, i.e., first pass integrate with an assumption of no time error, then an assumption of a +1 ms error, then −1 ms error, then +2 ms error, and so on. The correct time offset produces the highest signal.

Therefore, to achieve high sensitivity one needs to know the bit pattern and time synchronization in order to align the bits with the received GPS signal. Note that bit synchronization requires both internal GPS receiver clock synchronization and knowledge of the approximate receiver position. Currently, the transmitted A-GPS message provides all the necessary information.

In general, the A-GPS message contains the following information depicted in Table 1 below:

TABLE 1

| Information | Broadcast or Point to Point | Derivable by receiver | Reusable |
|---|---|---|---|
| List of visible GPS satellites | P—P only | Yes from approx position and almanac | |
| Time synchronization | P—P only | From previous fixes | |
| Ephemeris values | Could be Broadcast | no | For one hour |
| Almanac values | Could be Broadcast | no | One week |
| Bit pattern | P—P only | Yes | Yes |
| Approximate position | P—P only | From previous fixes | For some time |

One of the goals is to enable high sensitivity GPS without requiring point-to-point communication between the base unit and the GPS receiver. As can be seen from Table 1 above, information, in addition to ephemeris and almanac values, needs to be provided to the GPS receiver using a P-P communication channel. If this information cannot be obtained by a mechanism other than a P-P communication, then the ephemeris and almanac information may be transmitted in addition to the other information. However, there are situations when time synchronization and an approximate position can be propagated from previous observations. In such cases, a high sensitivity fix can be obtain autonomously without requiring a P-P communication.

An important aspect of the present invention is the ability for a semiautonomous device to produce high sensitivity GPS fixes that are not time critical. For example, tracking containers or car theft security. In this case, periodically, e.g., every 30 minutes, a device uses known ephemeris values to determine GPS signal bits and attempts to obtain a fix, update position, calibrate the internal clock based on the position value, and, if possible, updates the ephemeris and almanac information for the next use. If the GPS receiver is required to send position to the control center, the receiver need only listen for a new almanac/ephemeris information broadcast. In this case, one control center is able to monitor a very large number of very sensitive tracking devices without requiring a P-P communication channel with each in order to enable a high sensitivity fix.

Figure 7:
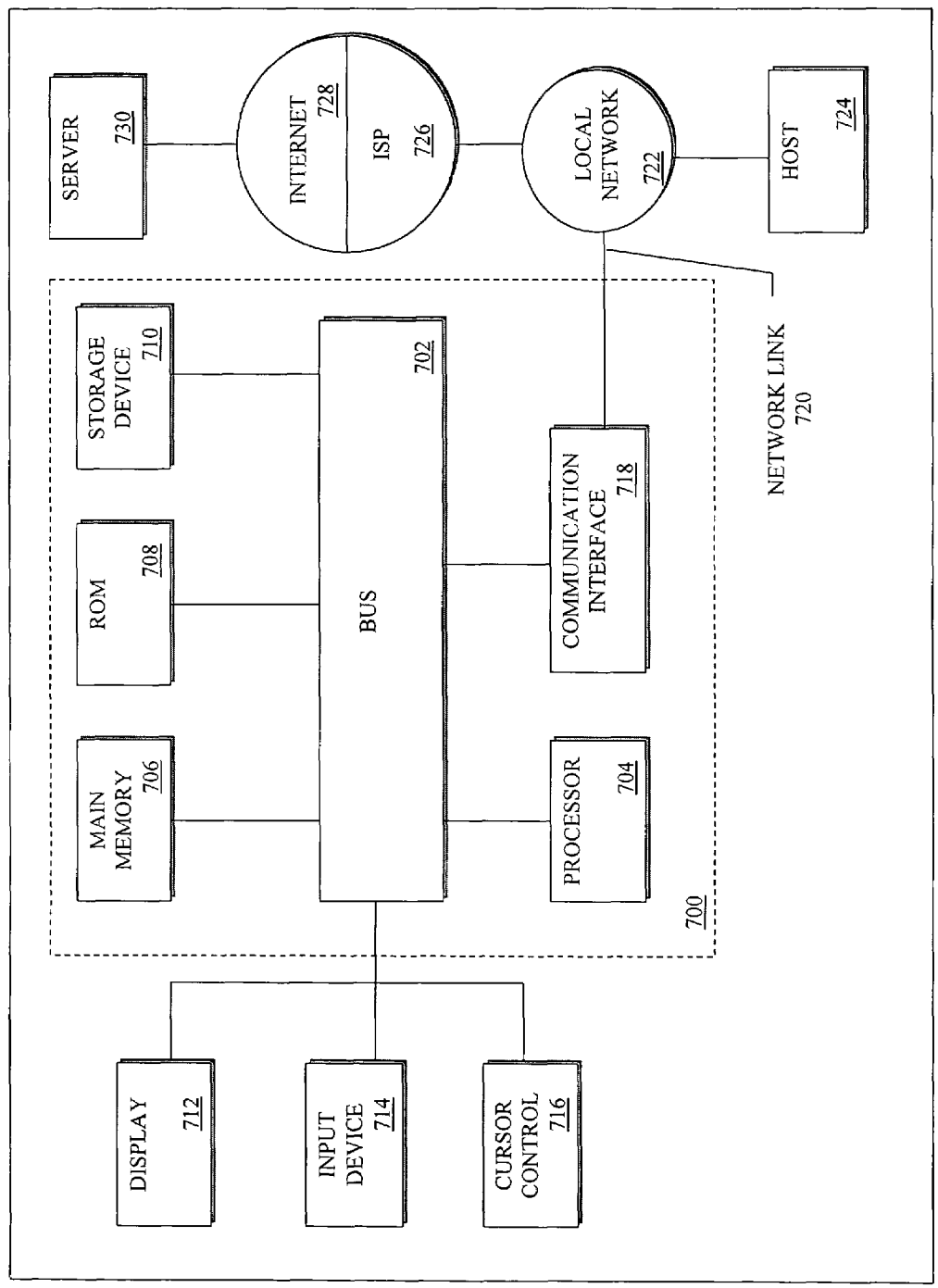
FIG. 7 is a block diagram of a computer system for use with an embodiment of the present invention.

FIG. 7 is a block diagram illustrating an exemplary computer or user device 700, e.g. a handheld device such as a mobile GPS receiver, upon which an embodiment of the invention may be implemented. The present invention is usable with currently available handheld and embedded devices, and is also applicable to personal computers, mini-mainframes, servers and the like.

Computer 700 includes a bus 702 or other communication mechanism for communicating information, and a processor 704 coupled with the bus 702 for processing information. Computer 700 also includes a main memory 706, such as a random access memory (RAM) or other dynamic storage device, coupled to the bus 702 for storing information including ephemeris and almanac information and GPS signal data according to an embodiment of the present invention and instructions to be executed by processor 704. Main memory 706 also may be used for storing temporary variables or other intermediate information during execution of instructions to be executed by processor 704. Computer 700 further includes a read only memory (ROM) 708 or other static storage device coupled to the bus 702 for storing static information and instructions for the processor 704. A storage device 710 (dotted line), such as a compact flash, smart media, or other storage device, is optionally provided and coupled to the bus 702 for storing instructions.

Computer 700 may be coupled via the bus 702 to a display 712, such as a flat panel touch-sensitive display, for displaying an interface to a user. In order to reduce space requirements for handheld devices, the display 712 typically includes the ability to receive input from an input device, such as a stylus, in the form of user manipulation of the input device on a sensing surface of the display 712. An optional input device 714 (dash dot line), such as a keyboard including alphanumeric and function keys, is optionally coupled to the bus 702 for communicating information and command selections to the processor 704. Another type of optional user input device is cursor control 716 (long dash line), such as a stylus, pen, mouse, a trackball, or cursor direction keys for communicating direction information and command selections to processor 704 and for controlling cursor movement on the display 712. This input device typically has two degrees of freedom in two axes, a first axis (e.g., x) and a second axis (e.g., y) allowing the device to specify positions in a plane.

The invention is related to the use of computer 700, such as the depicted computer of FIG. 2, to store and access data. According to one embodiment of the invention, data is stored and accessed by computer 700 in response to processor 704 executing sequences of instructions contained in main memory 706 in response to input received via input device 714, cursor control 716, or communication interface 718. Such instructions may be read into main memory 706 from another computer-readable medium, such as storage device 710.

However, the computer-readable medium is not limited to devices such as storage device 710. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 706 causes the processor 704 to perform the process steps described above. In alternative embodiments, hard-wired circuitry may be used in place of or in combination with computer software instructions to implement the invention. Thus, embodiments of the invention are not limited to any specific combination of hardware circuitry and software.

Computer 700 also includes a communication interface 718 coupled to the bus 702 and providing two-way data communication as is known in the art. For example, communication interface 718 may be an integrated services digital network (ISDN) card, a digital subscriber line (DSL) card, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals which carry digital data streams representing various types of information. Of particular note, the communications through interface 718 may permit transmission or receipt of instructions and data to be stored and accessed from the database. For example, two or more computers 700 may be networked together in a conventional manner with each using the communication interface 718.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals which carry digital data streams. The signals through the various networks and the signals on network link 720 and through communication interface 718, which carry the digital data to and from computer 700, are exemplary forms of carrier waves transporting the information.

Computer 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer 700 may obtain application code in the form of a carrier wave.

Advantageously, assuming bit synchronization has previously been achieved, the bit pattern need not be transmitted because most of the bits are able to be restored from the ephemeris and/or almanac values.

Additionally advantageous, ephemeris and almanac values need only be broadcast instead of sending bits via point to point communication.

In this manner, the present invention takes advantage of more than just knowing the GPS signal bit pattern, but further relies on a constant self propagation of information where a previous fix is used to create conditions for a next high sensitivity fix with possible periodic ephemeris and almanac broadcasts.

Further advantageously, ephemeride and almanac values need only be broadcast periodically. According to an embodiment of the present invention, the ephemeris and almanac values are stored at the receiver and used to restore information bits and used to enhance sensitivity of both acquisition and real-time tracking. Because ephemeris information is usable for 2 hours, an asset tracking device, for example, can wake up once an hour, listen to a strong broadcast of the ephemeris information, and obtain an accurate fix even if the asset is inside a building or otherwise prevent from receiving a GPS satellite signal. Almanac information is usable for 24 hours and is usable in a similar manner in an asset tracking device.

In another embodiment, value of the almanac and ephemeris information previously decoded by the GPS receiver at a time when a GPS signal is strong may be used to enhance acquisition and tracking when the GPS signal becomes weak, e.g., the GPS receiver is moved under dense tree coverage, by restoring the information bits as described above. This embodiment would not require a datalink between the GPS receiver and a GPS base station.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof

What is claimed is:

1. A method of assisting GPS position determination comprising:
   receiving ephemeris information for a GPS satellite over a datalink;
   receiving updated almanac information for a GPS satellite over a datalink;
   based on the received updated almanac information and GPS parity algorithms, reconstructing data bits of the GPS signal;
   based on the current time, synchronizing the reconstructed data bits with the time of reception of a GPS signal from a satellite currently in view;
   subtracting the reconstructed data bits from the received GPS signal at the synchronized time;
   coherently integrating the received GPS signal over the time period corresponding to the reconstructed data bits to obtain a GPS pseudo-range measurement; and
   determining the GPS receiver position using the generated, synchronized pseudo-range measurement and the ephemeris information received over the datalink.

2. The method as claimed in claim 1, wherein the datalink is a one-to-many broadcast.

3. The method as claimed in claim 1, wherein the information received over the datalink is formatted for transmission over the datalink.

4. The method as claimed in claim 1, wherein the step of reconstructing data bits reconstructs 240 contiguous data bits.

5. The method as claimed in claim 4, wherein the contiguous data bits are words 3 through 10 of sub-frame 5 of the GPS signal.

6. The method as claimed in claim 4, wherein the contiguous data bits are words 3 through 10 of sub-frame 4 of the GPS signal.

7. The method as claimed in claim 1, wherein the subtracting step removes a plurality of bits of data from the received GPS signal.

8. The method as claimed in claim 1, wherein the subtracting step removes a plurality of seconds of data from the received GPS signal.

9. The method as claimed in claim 1, wherein the step of coherently integrating is performed for more than one satellite.

10. The method as claimed in claim 1, wherein the received ephemeris information is received from a periodic broadcast.

11. The method as claimed in claim 10, wherein the periodic ephemeris broadcast is broadcast at least once per hour.

12. The method as claimed in claim 1, wherein the received almanac information is received from a periodic broadcast.

13. The method as claimed in claim 12, wherein the periodic almanac broadcast is broadcast at least once per 24 hours.

14. The method as claimed in claim 1, further comprising the steps of:
   storing the reconstructed data bits of the GPS signal; and
   subsequent to storing the reconstructed data bits, performing the synchronizing, subtracting, integrating, and determining steps using the stored reconstructed data bits.

15. The computer system of claim 1, wherein all of the steps are performed by a mobile GPS receiver.

16. The computer system of claim 17, wherein the computer system is a mobile GPS receiver.

17. A method of assisting GPS position determination comprising:
   receiving ephemeris information for a GPS satellite currently in view from a GPS signal transmitted by the GPS satellite at a GPS receiver;
   receiving almanac information for a GPS satellite from a GPS signal transmitted by the GPS satellite at a GPS receiver;
   after receipt of ephemeris information and almanac information, moving the GPS receiver to a covered environment;
   based on the received almanac information, ephemeris information, and GPS parity algorithms, reconstructing data bits of the GPS signal;
   based on the current time, synchronizing the reconstructed data bits with the time of reception of a GPS signal from a satellite currently in view;
   subtracting the reconstructed data bits from the received GPS signal at the synchronized time;
   coherently integrating the received GPS signal over the time period corresponding to the reconstructed data bits to obtain a GPS pseudo-range measurement; and
   determining the GPS receiver position using the generated, synchronized pseudo-range measurements and the received ephemeris information.

18. The method as claimed in claim 17, wherein the step of reconstructing data bits reconstructs 240 contiguous data bits.

19. The method as claimed in claim 18, wherein the contiguous data bits are words 3 through 10 of sub-frame 5 of the GPS signal.

20. The method as claimed in claim 18, wherein the contiguous data bits are words 3 through 10 of sub-frame 4 of the GPS signal.

21. The method as claimed in claim 17, wherein the subtracting step removes a plurality of bits of from the received GPS signal.

22. The method as claimed in claim 17, wherein the subtracting step removes a plurality of bits of from the received GPS signal.

23. The method as claimed in claim 17, wherein the step of coherently integrating is performed for more than one satellite.

24. A computer system for assisting GPS position determination comprising:
   one or more processors for receiving and transmitting data; and
   a memory coupled to said one or more processors, said memory having stored therein received ephemeris information and updated almanac information for a GPS satellite over a datalink, GPS parity algorithms, and sequences of instruction which, when executed by one of said one or more processor, cause one of said one or more processors to reconstruct data bits of the GPS signal based on the stored almanac information and GPS parity algorithms, synchronize the reconstructed data bits with the time of reception of a GPS signal from a satellite currently in view based on the current time, coherently integrate the received GPS signal over the time period at the synchronized time, coherently integrate the received GPS signal over the time period corresponding to the reconstructed data bits to obtain a GPS pseudo-range measurement, and determine a position using the generated, synchronized pseudo-range measurement and the stored ephemeris information.

25. The computer system as claimed in claim 24, wherein the data bits reconstructed comprise 240 contiguous data bits.

26. The computer system as claimed in claim 24, wherein the received ephemeris information is received from a periodic broadcast.

27. The computer system as claimed in claim 26, wherein the periodic ephemeris broadcast is broadcast at least once per hour.

28. The computer system as claimed in claim 24, wherein the received almanac information is received from a periodic broadcast.

29. The computer system as claimed in claim 28, wherein the periodic almanac broadcast is broadcast at least once per 24 hours.

30. The computer system of claim 24, wherein the processor is in a mobile GPS receiver.

31. A computer system for assisting GPS position determination comprising:
   one or more processors for receiving and transmitting data; and
   a memory coupled to said one or more processors, said memory having stored therein received ephemeris information and updated almanac information for a GPS satellite from a GPS signal transmitted by the GPS satellite, GPS parity algorithms, and sequences of instructions which, when executed by one of said one or more processors after determining that the computer system is in a covered environment, cause one of said one or more processors to reconstruct data bits of the GPS signal based on the stored almanac information, ephemeris information, and GPS parity algorithms, synchronize the reconstructed data bits with the time of reception of a GPS signal from a satellite currently in view based on the current time, subtract the reconstructed data bits from the received GPS signal at the synchronized time, coherently integrate the received GPS signal over the time period corresponding to the reconstructed data bits to obtain a GPS pseudo-range measurement, and determine a position using the generated, synchronized pseudo-range measurement and the stored ephemeris information.

32. The computer system as claimed in claim 31, wherein the data bits reconstructed comprise 240 contiguous data bits.

33. The computer system of claim 31, wherein the processor is in a mobile GPS receiver.

* * * * *